United States Patent

Gormley et al.

Patent Number: 5,711,469
Date of Patent: Jan. 27, 1998

[54] PORTABLE PHONE POUCH, MOUNTING AND USAGE SYSTEM

[75] Inventors: Alfred E. Gormley, Stratford, Conn.; John T. Pavol, Plainsboro, N.J.

[73] Assignee: Cutting Engineering Inc., Trumbull, Conn.

[21] Appl. No.: 692,204

[22] Filed: Aug. 5, 1996

[51] Int. Cl.⁶ ................... A45F 3/00; B60R 7/05
[52] U.S. Cl. ............ 224/675; 224/312; 224/929; 224/930; 224/236; D3/218; D12/417
[58] Field of Search .................. 224/312, 901.8, 224/929, 930, 603, 604, 605, 222, 676, 674, 675, 235, 236; D3/215, 218, 224, 225, 226, 230; D12/417

[56] References Cited

U.S. PATENT DOCUMENTS

| | | | |
|---|---|---|---|
| D. 322,719 | 12/1991 | Jayez | D3/218 |
| 1,382,446 | 6/1921 | Warren | 224/222 |
| 4,420,078 | 12/1983 | Belt et al. | 224/901.8 |
| 4,479,596 | 10/1984 | Swanson | D3/218 |
| 4,896,805 | 1/1990 | Klaczak et al. | 224/675 |
| 4,913,326 | 4/1990 | Echelson | 224/930 |
| 4,957,231 | 9/1990 | Kalisher | 224/901.8 |
| 4,974,762 | 12/1990 | Boretsky et al. | 224/222 |
| 5,048,734 | 9/1991 | Long | 224/675 |
| 5,221,031 | 6/1993 | Prigmore | 224/901.8 |
| 5,263,618 | 11/1993 | Talavera | 224/605 |
| 5,348,347 | 9/1994 | Shink | 281/31 |
| 5,383,727 | 1/1995 | Rife | 383/11 |
| 5,402,924 | 4/1995 | Gilson | 224/312 |
| 5,413,262 | 5/1995 | Dewire et al. | 224/675 |
| 5,433,362 | 7/1995 | Battaglia | 224/312 |
| 5,503,316 | 4/1996 | Stewart | 224/901.8 |
| 5,505,356 | 4/1996 | Noriega | 224/675 |
| 5,586,704 | 12/1996 | Alexander et al. | 224/605 |

Primary Examiner—David J. Walczak
Assistant Examiner—Gregory M. Vidovich

[57] ABSTRACT

A pouch body (12) used to contain a portable phone utilizes a closure strap (18) to seal the top opening of the pouch with a hook and loop material fastening piece. The phone may be used in the normal manner through the pouch utilizing the flexible transparent window material (38) to view the phone display and activate the phones keypad. The pouch may be mounted to a belt, strap or any similar sized object using the loop fastener mounting strap (26) with strap adhered to itself (32) attached to hook fastener patch (34). The pouch is also mountable to the sun visor of any vehicle by attaching the pouches loop fastener mounting strap (26) while adhered to hook fastener patch (34) to either the 1st hook attachment strip (42) or 2nd hook attachment strip (46) provided on the expandable mounting band (40).

7 Claims, 6 Drawing Sheets

PORTABLE PHONE POUCH, MOUNTING AND USAGE SYSTEM

CROSS REFERENCES TO RELATED APPLICATIONS

1. Background—Field of Invention

This invention is related to Portable Phone/Portable Two Way Wireless Radio communications products and the improvement of their containment, usage, transportation & usage during transportation, 2. Background—Description of Prior Art Presently there are devices for holding portable phones and or other articles in a vehicle in an organized manner during transportation.

One such holder for small articles which is described in U.S. Pat. No. 5,383,727 to Rife (Jan. 24, 1995), consists of front and back portions, pair of side edges as well as a bottom edge, with the side edges as well as the bottom edge of the pouch being closed. The front edge of the pouch is made of elasticized material, thus enabling the user to readily move the front edge away from fie back edge for the insertion of an item into the pouch, or to permit the retrieval of an item from the pouch. The upper edge of the back portion, and an external portion of the upper edge of the back portion serves as a mounting location for the pouch.

Although the device is suitable for containment of articles the limitation of the structure is to containment only and not to usage of the object, visually or functionally while being contained. Additionally the attachment is limited to surface attachment and therefore not being securely fastened around an object as well as being easily separated when the need arises.

Another such device for the containment of articles is the pocketbook organizer described in U.S. Pat. No. 5,348,347 to Shink (Sept. 20, 1994), comprises a pocketbook size organizer that can store a portable cellular phone. The organizer comprises a flexible book which has a first cover portion that can fold onto a center cover portion and a second cover portion that folds onto the first cover portion. The book has hook and loop material that fastens the second cover to the first cover to secure the organizer in a folded condition. The inside of the first cover has a pair of straps that secure the portable phone to the book.

This pocketbook does retain the cellular phone however it fails to address the need for usage and accessibility during containment. This device therefor requires removal for usage as well as a means to retain the pocketbook itself during transport thus adding the need for further containment while driving such as a pocket or briefcase thus limiting the usage of the communication device.

Another organizer which is for the visor is described in U.S. Pat. No. 5,402,924 to Gilson (Apr. 4, 1995), consists of A visor attachment which can be easily affixed to and removed from the visor of an automobile, truck or aircraft. The device includes a "U" shaped frame constructed from a moldable plastic, a stretchable mesh panel spanning the frame and a pair of elastic bands connected to the sides of the frame and adapted to encircle the visor in a manner to hold the attachment securely in place. However the ease of attachment and removal do not provide the user with an alternative attachment in order to continue to retain the objects after removal from the visor.

A carrying case for attachment to the visor such as the one described in U.S. Pat. No. 5,433,362 to Battaglia; (Jul. 18, 1995), for use on a vehicle sun visor and for use away from the sun visor has a rectangular case body having a periphery. The body is foldable in half at a centerline for dividing the front and the back sides into two halves each. A zipper is connected around the periphery of the case body for closing the case body when the case body is folded with the two halves of the front side facing each other. A pair of spaced straddling straps are connected to one of the halves of the front side for fixing the case body to a sun visor. A zipper pocket is on the back side of the case body as is a belt loop.

Effective for holding documents and change the structure requires the user to remove the entire device from the visor in order to take the objects retained within its structure with the user when leaving the vehicle. Since the pouch spans the entire visor width the objects contained can not be indexed to a window or location of operation within the pouch.

OBJECTS AND ADVANTAGES

Accordingly, several objects and advantages of my invention are: the ability to talk through the carrying case/pouch without requiring holes to be added to the material; the ability to securely mount the case to the visor of a vehicle without a permanent fixture; protection of the phone from abrasion, dirt, grease and the elements; the ability to securely mount the case on any other object such as a belt, strap, tool belt etc. using the same mounting feature as used on the vehicle visor with its secondary function thus eliminating the need for another structure; and the phone remains completely functional while contained within the pouch, visually through the keypad/display window, audibly (may hear phone ring, dial, error messages etc.) and physically (buttons and switches activated, antenna extended or may permanently protrude etc.)

Still further objects and advantages will become apparent from a consideration of the ensuing description and accompanying drawings.

Figure 1A:
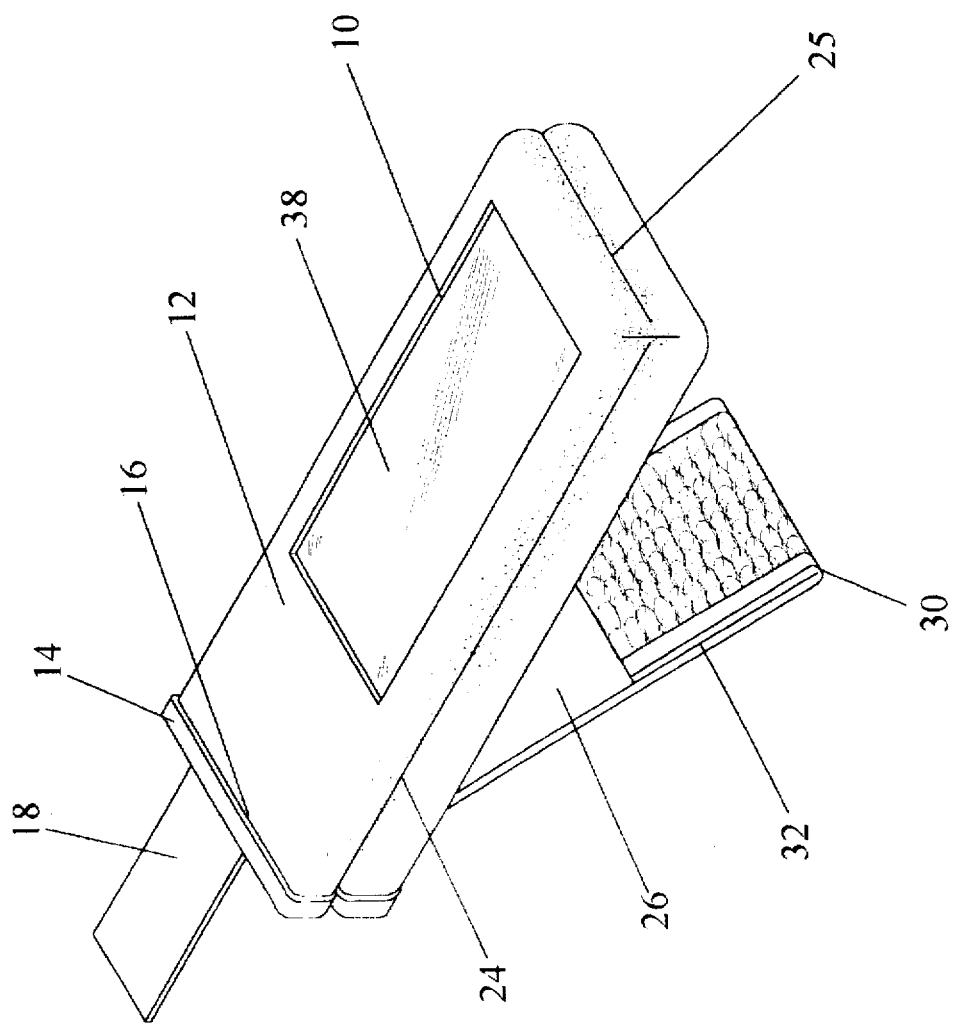
FIG. 1a is a perspective view of the pouch from FIG. 4

REFERENCE NUMERALS 10 window opening
11 window to pouch body adherence
12 pouch body
14 edge ribbon
16 edge ribbon adherence
18 closure strap
19 closure strap adherence
20 strap hook fastener
22 strap hook fastener adherence
24 pouch side seam adherence
25 bottom seam adherence
26 loop fastener mounting strap
28 strap adherence
30 strap folds over on itself
32 strap adhered to itself
34 hook fastener patch 36 hook fastener patch adherence
38 flexible transparent window material
40 expandable mounting band
42 1st hook attachment strip
44 1st hook strip adherence
46 2nd hook attachment strip
48 2nd hook attachment strip adherence
50 expandable mounting band seam
52 portable phone
54 front face of the phone
56 belt or fixed object
58 sun visor

SUMMARY

A pouch body used to contain a portable phone or two way communication device which utilizes a closure strap to seal the top opening of the pouch with a hook and loop material fastening piece. The phone may be used in the normal manner through the pouch utilizing the flexible transparent window material to view the phone display and activate the phones keypad. The pouch may be mounted to a belt, strap or any similar sized object using the loop fastener mounting strap. The pouch is also mountable to the sun visor of any vehicle or any object it may circumscribe by attaching the pouches loop fastener mounting strap to either the 1st hook attachment strip or 2nd hook attachment strip provided on the expandable mounting band. The scope of the invention provides a particularly versatile simplistic and effective way to contain a portable phone or a wireless communication device.

Preferred Embodiment—Description

MAIN EMBODIMENT: DESCRIPTION
FIG. 1a—Perspective View of Pouch

Figure 1B:
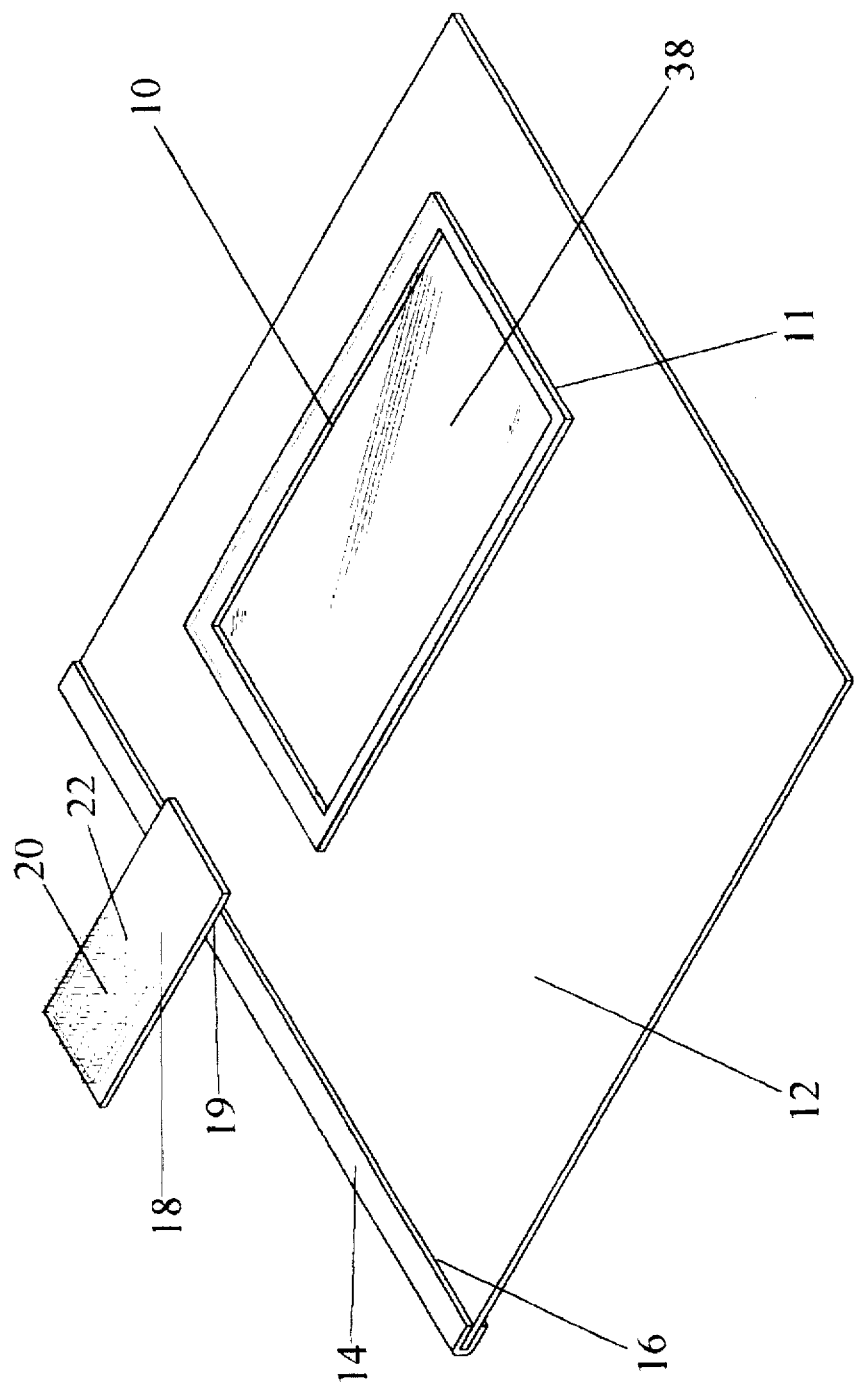
FIG. 1b is a laid flat view of the pouch from FIG. 4
Figure 4:
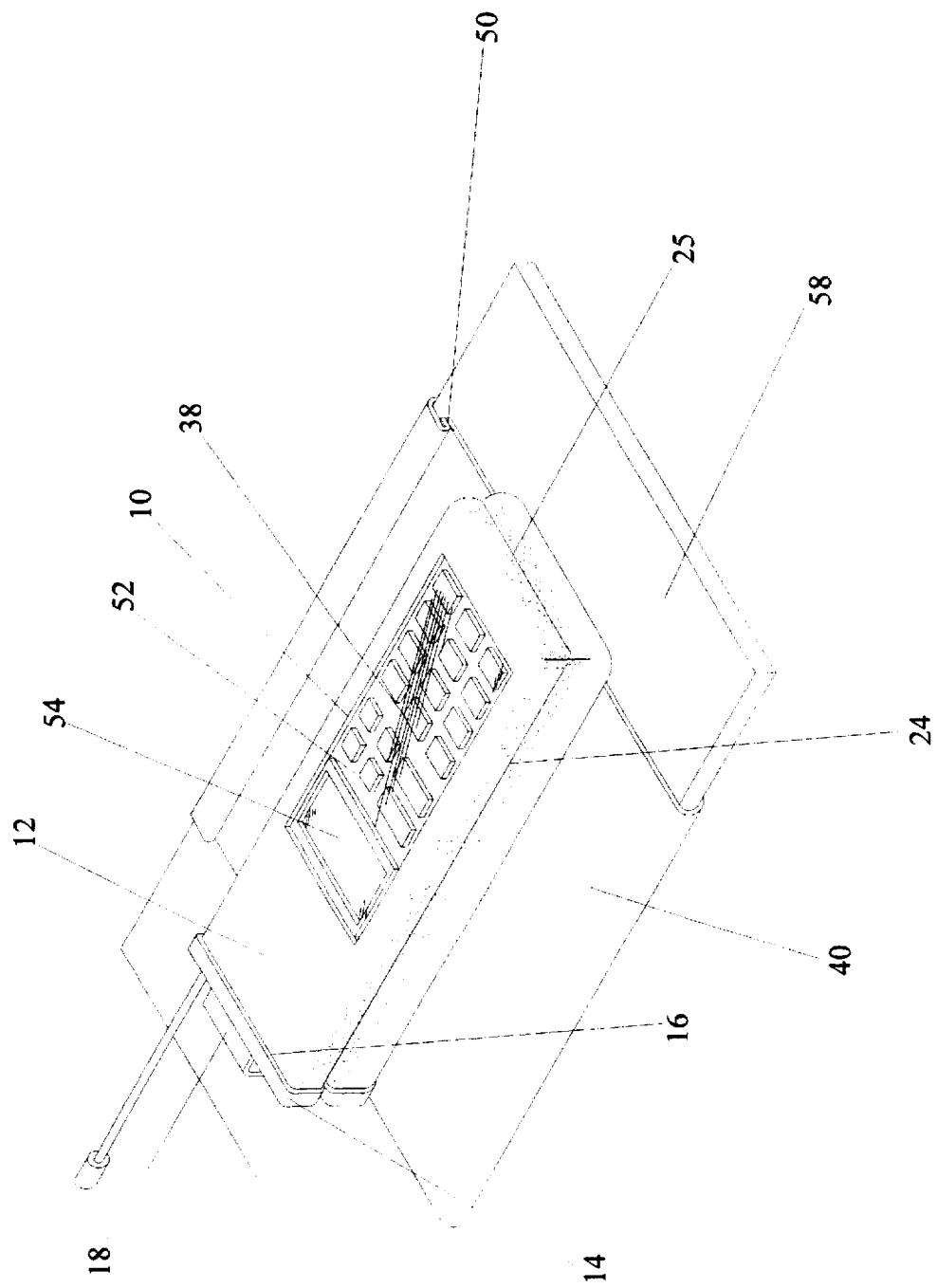
FIG. 4 is a perspective view of the pouch and its mounting system in accordance with the invention

FIG. 1a shows a perspective view of the pouch from FIG. 4, which consists of pouch body 12 with edge ribbon 14 which is center folded and overlaps top edge of outside surface and inside surface of pouch body 12 with equal distance. Edge ribbon 14 is attached to pouch body 12 with edge ribbon adherence 16, e.g. stitching, gluing etc., Closure strap 18 extends out from edge ribbon 14 were it is adhered (shown in FIG. 1b) using closure strap adherence 19. Loop fastener mounting strap 26 extends down along the back side of pouch body 12 towards closed bottom seam adherence 25. Loop fastener mounting strap 26 folds over on itself 30 to then form strap adhered to itself 32. Flexible transparent window material 38 is visible through window opening 10.
FIG. 1b—Laid Flat View of The Pouch FIG. 1b shows a laid flat view of the pouch from FIG. 4 prior to folding of pouch body 12 in half with the inside (unfinished surface) exposed. Closure strap 18 is secured at one end by closure strap adherence 19 to the inside surface of pouch body 12 at edge ribbon 14. Closure strap 18 extends from this point with strap hook fastener 20 attached to closure strap 18 using strap hook fastener adherence 22 e.g. stitching, gluing etc.. Flexible transparent window material 38 is attached to interior surface of pouch body 12 at window opening 10 using window to pouch body adherence 11, e.g. stitching gluing etc.

Pouch body 12 is formed by the folding of pouch body 12 in half with the inside (unfinished surface) exposed. The pouch side seam adherence 24 and bottom seam adherence 25 (shown in FIG. 1a) are created with the two outside finished surfaces touching e.g. stitching, gluing etc. This structure is the pouch body 12 reversed which is then turned inside out so that the outside (finished surface) is showing when completed.

Figure 2A:
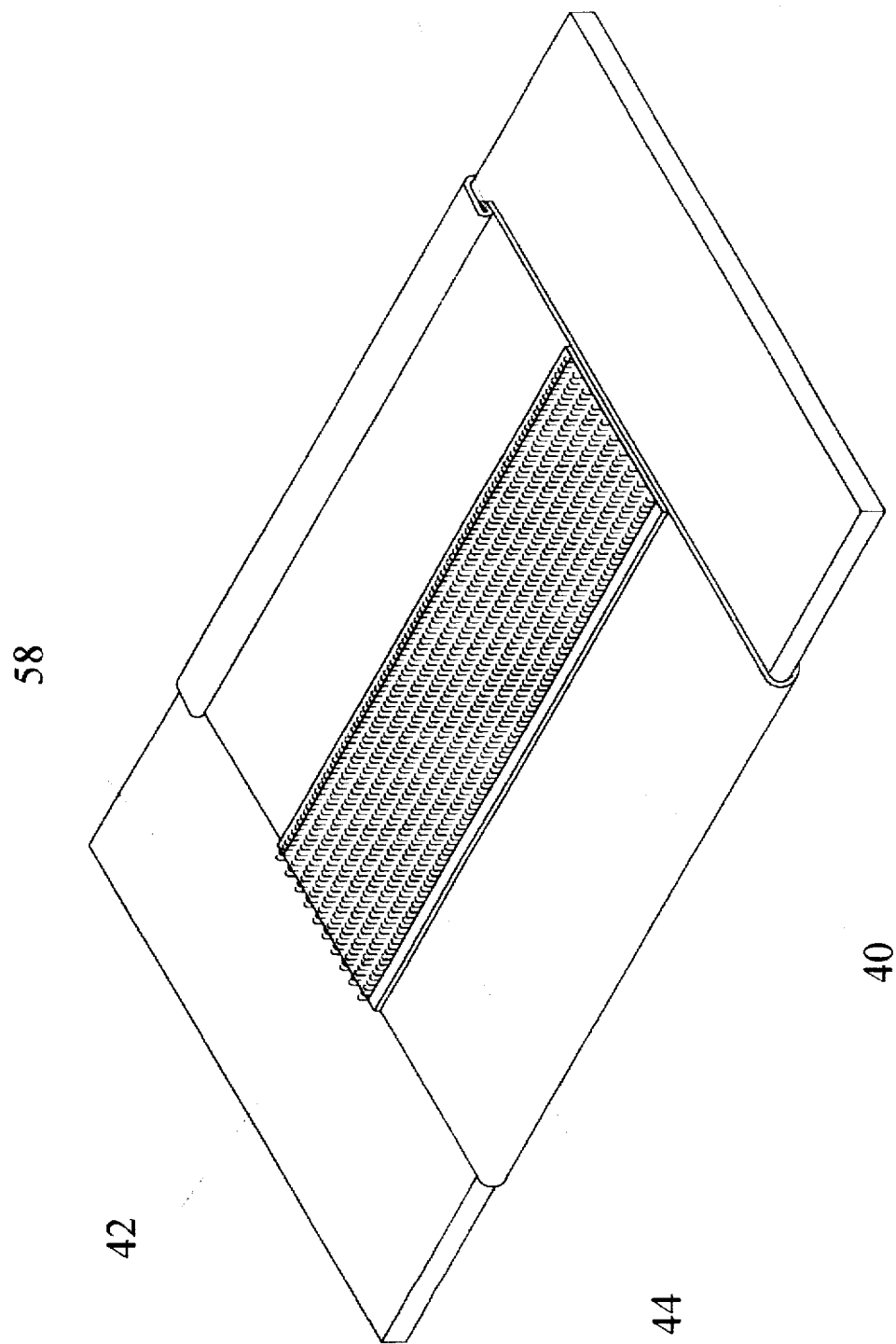
FIG. 2a is a perspective view of the visor mounting attachment device shown in FIG. 4

FIG. 2a—Perspective View of Visor Mounting Attachment Device

Figure 2B:
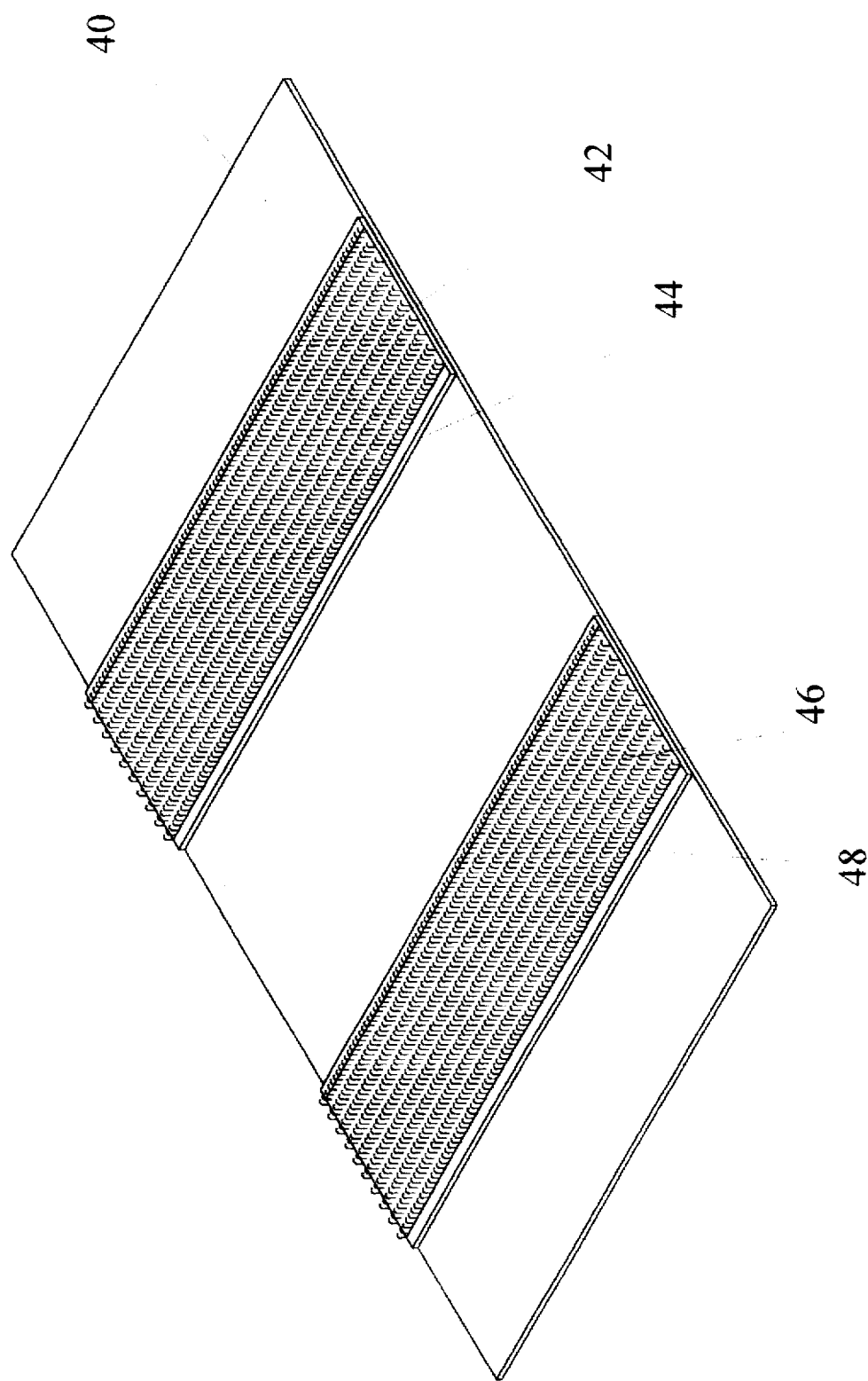
FIG. 2b is a laid flat view of the visor mounting attachment device shown in FIG. 4

FIG. 2a shows a perspective view of visor mounting attachment device shown in FIG. 4, which consists of expandable mounting band 40 with 1st hook attachment strip 42 attached to expandable mounting band 40 using 1st hook strip adherence 44. The visor mounting attachment device is shown with sun visor 58 inserted into the expandable mounting band 40.
FIG. 2b—Laid Flat View of The Visor Mounting Attachment Device FIG. 2b is a laid flat view of the visor mounting attachment device shown in FIG. 4. Shown is the 1st hook attachment strip 42 attached to expandable mounting band 40 using 1st hook strip adherence 44. The 2nd hook attachment strip 46 is attached to expandable mounting band 40 using 2nd hook attachment strip adherence 48.

Figure 3:
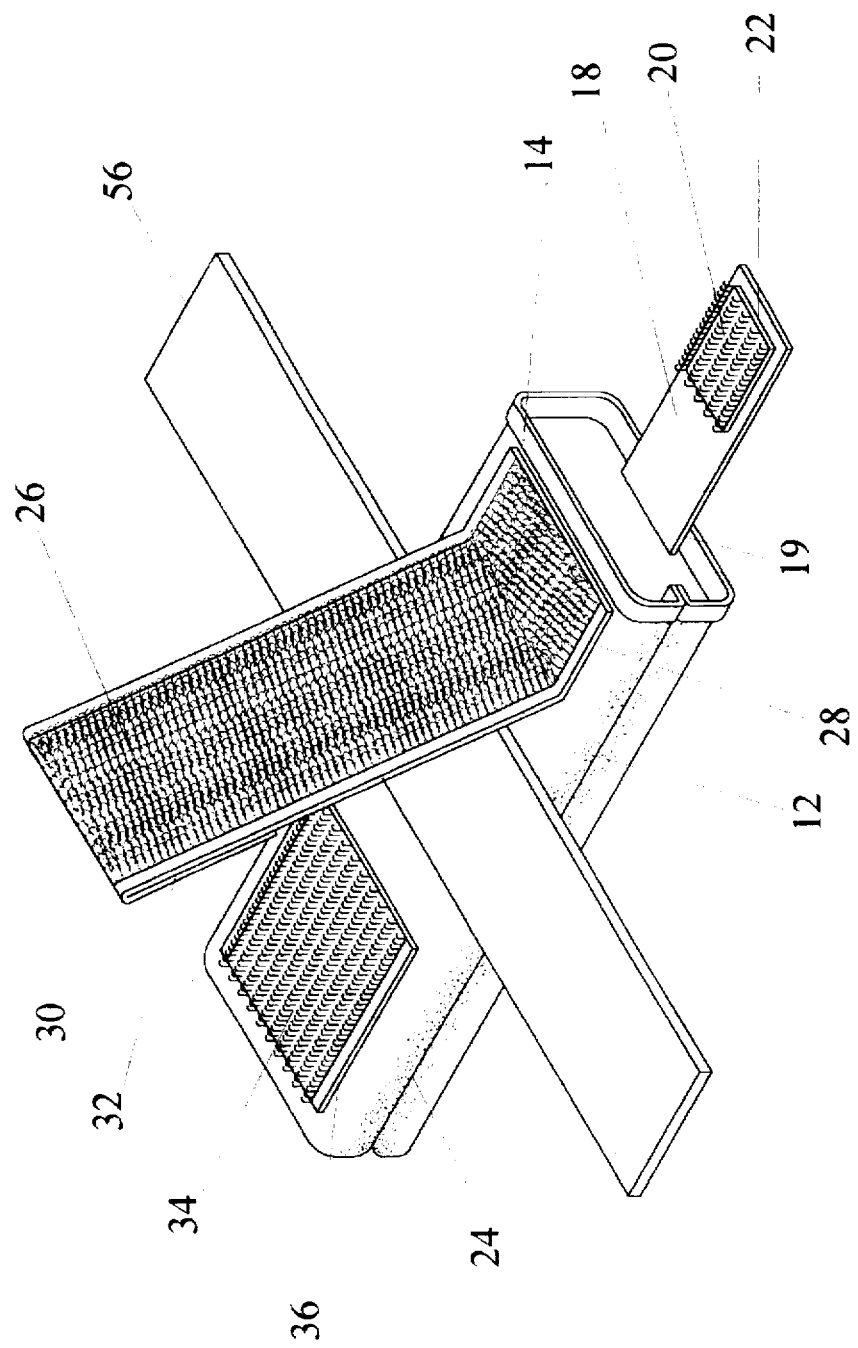
FIG. 3 is a perspective view of the back of the pouch from FIG. 4 showing the alternative attachment feature

Expandable mounting band 40 is formed by folding it in half so that 1st hook attachment strip 42 and 2nd hook attachment strip 46 are attached to the inside surface of the expandable mounting band 40. Then the expandable mounting band 40 is attached to itself at expandable mounting band seam 50 forming a tube of material which has 1st hook attachment strip 42 and 2nd hook attachment strip 46 on inner surface of the expandable mounting band 40 now a tube. This tube of material is then turned inside out causing the 1st hook attachment strip 42 and 2nd hook attachment strip 46 to be on outer surface of the expandable mounting band 40 now a tube when finished (shown in FIG. 2a).
FIG. 3—Perspective View of The Back of The Pouch FIG. 3 is a perspective view of the back of the pouch from FIG. 4 showing the alternative attachment feature. The back side of the loop fastener mounting strap 26 is adhered to the back of pouch body 12 at open end of pouch body 12 by strap adherence 28 e.g. stitching, gluing etc.. Hook fastener patch 34 is attached to back of pouch body 12 at lower sealed end using Hook fastener patch adherence 36. Hook fastener patch 34 is aligned to accept strap adhered to itself 32. Belt or fixed object 56 can be placed under loop fastener mounting strap 26 causing pouch from FIG. 4 to be retained on the object.
FIG. 4—Perspective View of The Pouch and Mounting System FIG. 4 is a perspective view of the pouch and its mounting system in accordance with the invention. FIG. 4 shows a view of the Portable Phone Pouch with portable phone 52 contained within its pouch body 12. Retaining the portable phone 52 within the pouch body 12 is the closure strap 18. The front face of the phone 54 is visible through the window opening 10 and flexible transparent window material 38. Also shown is edge ribbon 14 at the top open end of pouch body 12 with the pouch side seam adherence 24 and bottom seam adherence 25. In this view the Portable Phone Pouch is affixed to the expandable mounting band 40 utilizing the 'Hook & Loop' attachment feature comprised of the 1st hook attachment strip 42 (shown in FIG. 2a & 2b) and the loop fastener mounting strap 26 (shown in FIG. 3). The expandable mounting band 40 is wrapped around the sun visor 58 and held in the form of a tube by expandable mounting band seam 50 thus attached by the materials nature to contract around the sun visor 58.

Preferred Embodiments—Operation

MAIN EMBODIMENT: OPERATION

FIG. 4 is a perspective view of the pouch and its mounting system in accordance with the invention it shows the pouch after inserting hand held wireless communications device e.g. cellular phone, two way radio etc. into pouch body 12. The hand held wireless communications device is retained within pouch body 12 by folding closure strap 18 over the opening and attaching with strap hook fastener 20 (shown in FIG. 1b) to loop fastener mounting strap 26 (shown in FIG. 3) by use of 'Hook & Loop' closure system.

Also shown in FIG. 4 is portable phone 52 contained within the pouch body 12 the device can be operated by viewing its key pad and screen through the flexible transparent window material 38 and window opening 10. Operation of key pad can be accomplished simply by pressing selected buttons through the flexible transparent window material 38. Audio operation of the device may be accomplished using the normal operating procedure through the pouch body 12. The receiver speaker/ringer speaker may be heard through the material comprising pouch body 12. The transmission microphone may be utilized in the same manner of operation by speaking through the material comprising pouch body 12. Visual identification of communication reception will be accomplished through flexible transparent window material 38, if there is a visual notification that a transmission is being received.

FIG. 2a shows a perspective view of visor mounting attachment device shown in FIG. 4 The expandable mounting band 40 is fitted over sun visor 58 from a vehicle e.g. car, truck boat, plane etc. The 1st hook attachment strip 42 and 2nd hook attachment strip 46 can be rotated on the sun visor 58 by rotating the expandable mounting band 40 in order to position the expandable mounting band 40 for optimal attachment of pouch from FIG. 4 to sun visor 58 in a raised or lowered position.

The pouch body 12 with loop fastener mounting strap 26 may be attached to the expandable mounting band 40 (shown in FIG. 4). The pouch body 12 can be attached to the expandable mounting band 40 by placing loop fastener mounting strap 26 (shown in FIG. 3) against 1st hook attachment strip 42 or 2nd hook attachment strip 46 on expandable mounting band 40 (shown in FIG. 2b) and applying sufficient pressure as to engage 'Hook & Loop' fastening system. The pouch body 12 with portable phone 52 will remain attached until removal by peeling loop fastener mounting strap 26 away from expandable mounting band 40 thus disengaging loop fastener mounting strap 26 from the expandable mounting band 40. Loop fastener mounting strap 26 stays attached to the hook fastener patch 34 on the back of pouch body 12 during this procedure so that the pouch may be easily handled.

FIG. 3 is a perspective view of the back of the pouch from FIG. 4 showing the alternative attachment feature to any belt or fixed object 56 that will fit under loop fastener mounting strap 26 e.g. belt, strap, retaining rings etc. By placing object under loop fastener mounting strap 26 and depressing loop fastener mounting strap 26 with the strap adhered to itself 32 onto hook fastener patch 34 the pouch body 12 may be retained to belt or fixed object 56. For removal of portable phone 52 from pouch body 12, lift closure strap 18 by peeling strap hook fastener 20 from loop fastener mounting strap 26. Conversely the entire pouch body 12 can be removed from the belt or fixed object 56. This is accomplished by peeling the part of loop fastener mounting strap 26 were strap folds over on itself 30 from hook fastener patch 34 thereby releasing the entire pouch body 12 from the belt or fixed object 56 for usage of portable phone 52 while contained within the pouch body 12.

Conclusions, Ramifications, and Scope

Accordingly, it can be seen that, according to the invention, a portable/cellular phone pouch for retention and protection of the phone and an attachment device for a vehicle visor as well as to any other object it may circumscribe are provided in an economical, easily manufactured, and highly durable manner.

Although the description above contains many specificities, these should not be construed as limiting the scope of the invention but as merely providing illustrations of some of the presently preferred embodiments of this invention. Various other embodiments and ramifications are possible within it's scope. For example, the pouch may contain any communication device of one way or two way nature in a manner that allows for all its functions to be utilized as well as being protected from the elements, loss, misplacement and or related transportational issues such as damage to phone, vehicle, person from poor retention/ containment during transport.

Thus the scope of the invention should be determined by the appended claims and their legal equivalents, rather than by the examples given.

What is claimed is:

1. A kit for holding a device, the kit comprising:
 a pouch configured to surround and contain a device, said pouch having an opening at an upper end thereof, a closure strap attached thereto for closing said opening, a loop fastener mounting strap having a first end attached to said pouch and second end having releasable attachment means thereon for selective releasable attachment to said pouch wherein said loop fastener mounting strap being configured for attachment to a support, and a first attachment strip attached to said mounting strap, said closure strap includes a first end secured to said pouch adjacent said opening and a second end having releasable engagement means thereon for selective releasable attachment to said mounting strap adjacent said opening;
 an expandable, loop configured to circumscribe and be secured about a vehicle sun visor, said loop having a second attachment strip secured thereto;
 such that, in use, said pouch is selectively attached to one of a support and a vehicle sun visor, wherein said loop fastener mounting strap provides retention about the support, and said first and second attachment strips being releasably engaged with each other to provide retention to the visor.

2. The kit as defined in claim 1 wherein said releasable attachment means comprises a hook and loop fastener.

3. The kit as defined in claim 1 wherein said first attachment strip comprises one of a hook and loop fastener and said second attachment strip comprises the other of the hook and loop fastener.

4. The kit as defined in claim 1 wherein said releasable engagement means comprises a hook and loop fastener.

5. The kit as defined in claim 1 wherein said releasable engagement means comprises a fastener attachable to said first attachment strip.

6. The kit as defined in claim 1 wherein the device is a portable, wireless communication device.

7. A method for holding a portable wireless communication device, the method comprising:
 providing a pouch configured to surround and contain the portable wireless communication device, said pouch further having a closure strap attached thereto for closing said pouch, a loop fastener mounting strap attached thereto, and a first attachment strip attached thereto;
 placing the portable wireless communication device in said pouch and closing said pouch with said closure strap; and selectively attaching said pouch to one of a support and a vehicle sun visor attachment, wherein said loop fastener mounting strap is configured to provide retention to the support, and wherein said sun visor attachment comprises an expandable mounting band for circumscribing a sun visor having a second attachment strip attached thereto said first and second attachment strips being releasably engaged with each other.

* * * * *